United States Patent [19]

Kawahara et al.

[11] Patent Number: 4,791,418

[45] Date of Patent: Dec. 13, 1988

[54] SIGNAL LIGHT

[75] Inventors: Hideo Kawahara; Harunobu Yoshida; Masato Hyodo, all of Osaka, Japan

[73] Assignee: Taliq Corporation, Sunnyvale, Calif.

[21] Appl. No.: 65,849

[22] Filed: Jun. 24, 1987

[51] Int. Cl.$^4$ .............................................. G09G 3/36
[52] U.S. Cl. .................................... 340/784; 350/331 R
[58] Field of Search ................... 340/84, 94, 118, 122, 340/124, 332, 765, 784, 907, 815, 32; 350/334, 444, 165, 438, 448, 331 R, 347 R

[56] References Cited

U.S. PATENT DOCUMENTS

| | | |
|---|---|---|
| 1,127,223 | 2/1915 | Fogle . |
| 1,359,492 | 11/1920 | Demuth .............................. 40/606 |
| 1,888,564 | 11/1932 | O'Rourke ........................... 40/606 |
| 2,871,599 | 2/1959 | Kolb .................................... 340/84 |
| 3,245,075 | 4/1966 | Staats ............................ 340/815.32 |
| 3,377,479 | 4/1968 | Schreiber ........................... 350/448 |
| 3,499,112 | 3/1970 | Heilmeier et al. ................. 178/7.7 |
| 3,853,392 | 12/1974 | Fergason ............................ 350/160 |
| 3,905,682 | 9/1975 | Meyerhofer ....................... 350/160 |
| 3,992,082 | 11/1976 | Katz ................................... 350/160 |
| 4,003,149 | 1/1977 | de Vries .............................. 40/20 |
| 4,268,126 | 5/1981 | Mumford ........................... 350/331 |
| 4,289,383 | 9/1981 | Schwarzschild .................. 350/334 |
| 4,315,258 | 2/1982 | McKnight et al. ................ 340/765 |
| 4,386,836 | 6/1983 | Aoki et al. ....................... 350/331 R |
| 4,398,805 | 8/1983 | Cole ............................... 350/347 R |
| 4,408,836 | 10/1983 | Kikuno ............................... 350/334 |
| 4,422,726 | 12/1983 | Harris et al. ....................... 350/331 |
| 4,435,047 | 3/1984 | Fergason ............................ 350/334 |
| 4,456,335 | 6/1984 | Mumford ........................... 350/331 |
| 4,457,589 | 7/1984 | Tamura et al. .................... 350/336 |
| 4,488,772 | 12/1984 | Georgopulos ...................... 350/331 |
| 4,514,920 | 5/1985 | Shafrir et al. ....................... 40/448 |
| 4,556,289 | 12/1985 | Fergason ............................ 350/350 |
| 4,562,433 | 12/1985 | Biferno .............................. 340/716 |
| 4,579,423 | 4/1986 | Fergason ............................ 350/334 |
| 4,580,876 | 4/1986 | Stolov et al. ...................... 350/339 |
| 4,584,786 | 4/1986 | Georgopulos ....................... 40/448 |
| 4,591,233 | 5/1986 | Fergason ............................ 350/334 |
| 4,596,445 | 6/1986 | Fergason ............................ 350/339 |
| 4,603,945 | 8/1986 | Fergason ............................ 350/331 |
| 4,605,284 | 8/1986 | Fergason ............................ 350/334 |
| 4,606,611 | 8/1986 | Fergason ............................ 350/334 |
| 4,613,207 | 9/1986 | Fergason ............................ 350/334 |
| 4,616,903 | 10/1986 | Fergason ............................ 350/334 |
| 4,643,528 | 2/1987 | Bell, Jr. .............................. 350/334 |
| 4,652,851 | 3/1987 | Lewin ................................. 340/94 |
| 4,662,720 | 5/1987 | Fergason ............................ 350/339 |
| 4,693,557 | 9/1987 | Fergason ............................ 350/331 |

FOREIGN PATENT DOCUMENTS 0081624 5/1984 Japan .............................. 350/334
188236 4/1960 Sweden .

Primary Examiner—Gerald L. Brigance
Assistant Examiner—Richard Hjerpe
Attorney, Agent, or Firm—Flehr, Hohbach, Test, Albritton, & Herbert

[57] ABSTRACT

A signal light comprising a light source and a liquid crystal means. The liquid crystal means is disposed between the light source and a viewing area of the signal light for blocking and transmitting light according to a given electrical input. The signal light further includes means for energizing the light source when the liquid crystal means transmits light and for de-energizing the light source when the liquid crystal means blocks light.

20 Claims, 2 Drawing Sheets

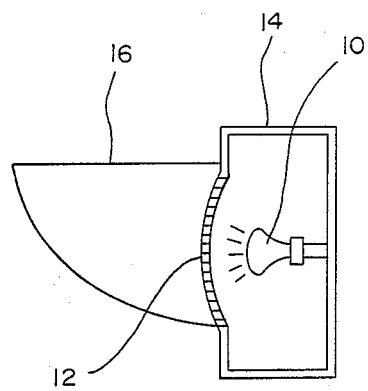
(PRIOR ART)
FIG.—1
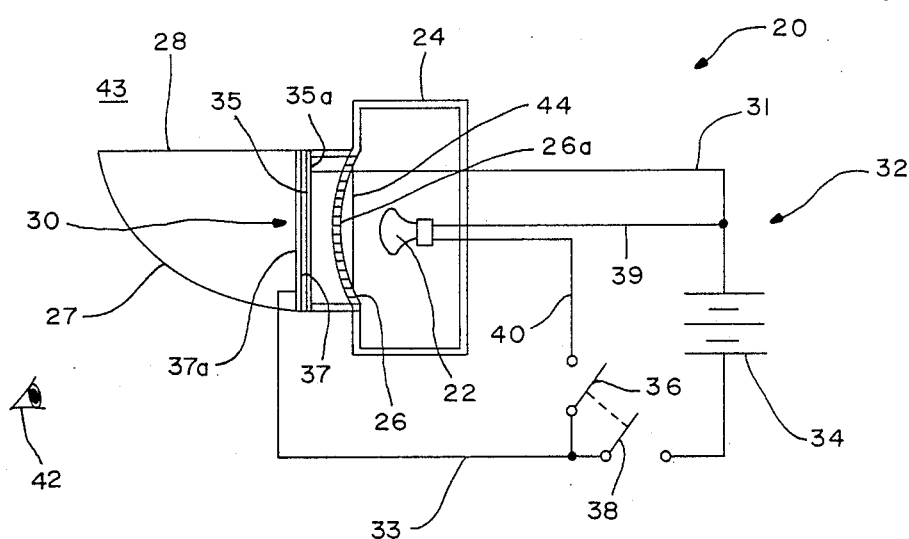
FIG.—2

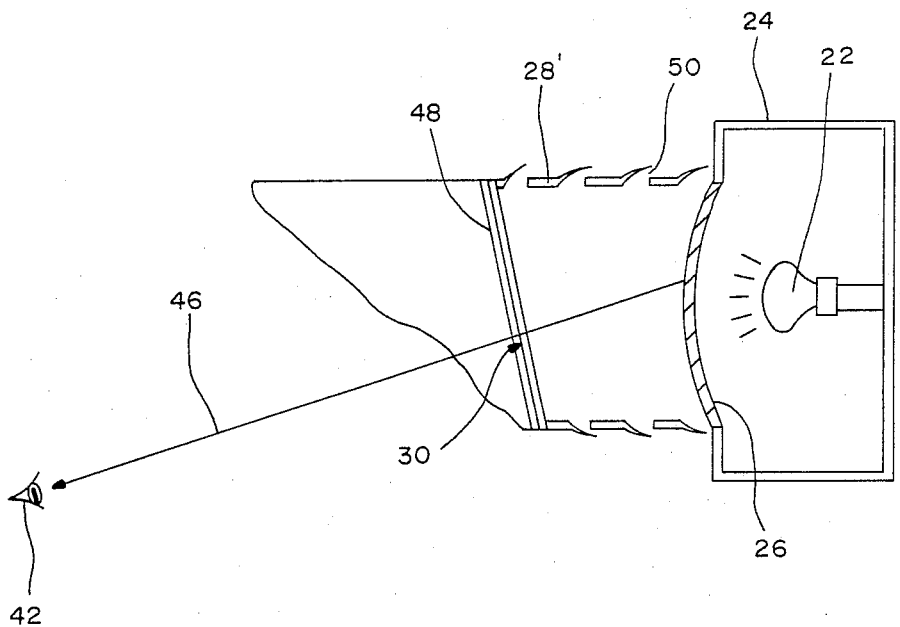
FIG.—3
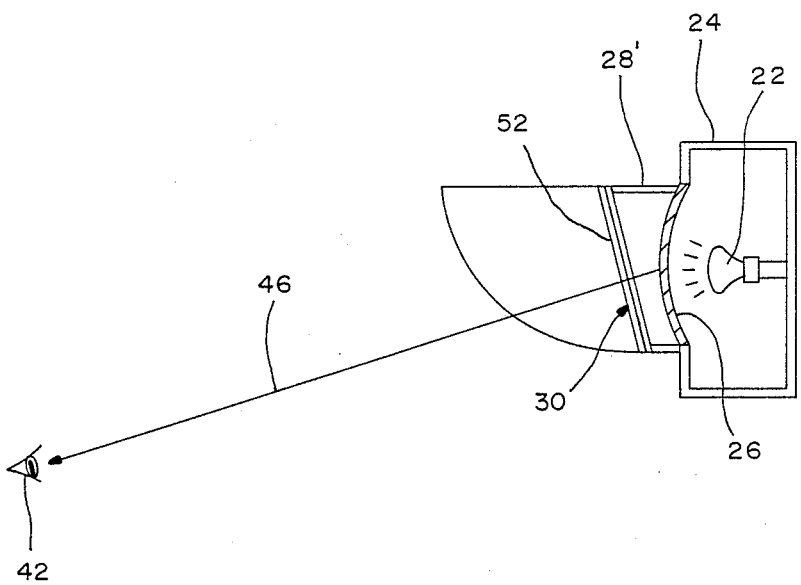
FIG.—4

SIGNAL LIGHT

BACKGROUND OF THE INVENTION

The present invention relates generally to signal lights, and more particularly to signal lights with increased visibility that are suitable for use as traffic signal lights, e.g., on roads or railways.

A type of traffic signal light utilized heretofore is illustrated in FIG. 1. Such lights generally comprise a lamp 10, a transparent colored cover 12, a casing 14, and a hood 16. Signal lights with red and green, or red, yellow and green transparent colored plates 12 are utilized in combination, and traffic signals are given by lighting one or the other of the signal lights.

However, when direct sunlight strikes a traffic signal light, an extinguished signal light is difficult to distinguish from a lit signal light. As a result, there is a danger of accident due to misreading of the signals.

It is possible to increase the brightness of lamp 10 in order to improve the visual distinguishability of the signal light. However there are limits to the effectiveness of this technique under direct sunlight.

The present invention eliminates the above-mentioned drawback of signal lights, and provides a signal light which can easily be visually distinguished even under direct sunlight conditions.

An object of the present invention is to provide a signal light that produces a signal that is easily, visually distinguishable under direct sunlight conditions.

A further object of the present invention is to provide a signal light that protects the liquid crystal material from ultraviolet light.

Another object of the present invention is to provide a signal light that reduces glare otherwise present thereon.

SUMMARY OF THE INVENTION

As may be seen hereinafter, the signal light disclosed herein is one which comprises a light source and a liquid crystal means disposed between the light source and a view area of the signal light for blocking or transmitting light according to a given electrical input. The signal light further includes means for applying electrical input to the liquid crystal means to transmit light when the light source is energized and for removing the electrical input to block light when the light source is de-energized.

BRIEF DESCRIPTION OF THE DRAWINGS

The present invention will be described in more detail hereinafter in conjunction with the drawings wherein:

FIG. 1 is a schematic, longitudinal section of a conventional traffic signal light;

FIG. 2 is a schematic, longitudinal section of a traffic signal light illustrating one aspect of the present invention;

FIG. 3 is a schematic, longitudinal section of a traffic signal light illustrating another embodiment of the present invention; and FIG. 4 is a schematic, longitudinal section of a traffic signal light illustrating yet another embodiment of the present invention.

DESCRIPTION OF THE PREFERRED EMBODIMENTS

Referring now to the drawings, wherein like reference numerals for like components are utilized through the drawings, attention is first directed to FIG. 2. FIG. 2 shows a signal light 20 having a lamp 22 installed inside a casing 24. A transparent colored plate or cover 26 is attached to the casing in front of the lamp. A cylindrical hood 28 with a obliquely cut tip as shown at 27 is attached in front of the transparent colored plate 26. An electro-optical liquid crystal device 30 is attached to the hood in a position which is removed from the colored plate by a distance of 5 centimeters or more.

The liquid crystal apparatus of device 30 may comprise an encapsulated operationally nematic liquid crystal material or nematic curvilinear line phases (NCAP) liquid crystal material. A detailed explanation of operationally nematic or NCAP liquid crystal material is provided in U.S. Pat. No. 4,616,903 issued Oct. 14, 1986, in the name of Fergason, entitled ENCAPSULATED LIQUID CRYSTAL AND METHOD, assigned to Manchester R&D Partnership, the disclosure of which is hereby incorporated by reference. Reference may also be made to U.S. Pat. No. 4,435,047, issued Mar. 6, 1984 in the name of Fergason, entitled ENCAPSULATED LIQUID CRYSTAL AND METHOD, assigned to Manchester R&D Partnership, which disclosure is also hereby incorporated by reference.

In the field-off condition, or in any other condition which results in the liquid crystal being in a distorted or randomly aligned state, the NCAP liquid crystal material scatters incident light. In the field-on condition or aligned state, incident light is transmitted through the NCAP material.

A schematic representation of a circuit 32 for selectively applying or not an electric field to the liquid crystal material of device 30 and lamp 22 is illustrated in FIG. 2.

Such a circuit 32 may include an electric power supply 34, such as a battery, and a pair of linked switches 36 and 38. The electric power supply may alternatively be a source of alternating current. The circuit is connected by electrical leads 31,33 to electrodes 35,37 positioned on opposite sides or surfaces of the liquid crystal apparatus 30. The liquid crystal material is located between the electrodes.

The electrodes 35,37 are subsantially optically transparent, and may be formed on optically transparent substrates 35a,37a such as an optically transparent polyester film.

The circuit may further include electrical leads 39,40 for supplying power from power supply 34 to lamp 22. Operationally, when switch 36 is open switch 38 is also open and no electric field is applied to the liquid crystal material or to lamp 22. With switch 38 open, the liquid crystal material is in the so-called de-energized or field-off condition or mode wherein light is scattered and/or absorbed, especially when combined with an appropriate dye, by the liquid crystal material.

When switch 36 is closed switch 38 is also closed, and power is supplied to lamp 22 and an electric field is applied across the liquid crystal material of device 30. Device 30 is then in the so-called energized or field-on condition or mode wherein light is transmitted through the liquid crystal material.

When the lamp is off or de-energized and the liquid crystal material is in the field-off or non-aligned or relatively free state, i.e., incident light is scattered and/or absorbed, neither lamp 22 nor transparent cover 26 can be visually observed by an observer or observing instrument 42 in the viewing area 43 in front of the signal. On the other hand, when the lamp is lit or energized and the liquid crystal material is in the so-called field-on or energized or aligned state, light is transmitted through the liquid crystal apparatus 30 without being scattered. Accordingly, light from the lamp passes through the transparent colored plate 26 and can be readily visually observed by observer 42.

As a result, the signal light portion that is lit is more easily visually distinguished from the signal light portion that is not lit.

In the signal light of the present invention, the visual distinguishability of the transparent colored plate 26 may be increased by coating the surface of that plate with a transparent light-scattering paint so that the light passing through the paint is scattered. In this embodiment, scattering is more effective if the surface coated with the paint is surface 26a that faces light source 22. This embodiment provides enhanced light scattering in the field-off state.

Furthermore, the visual distinguishability of the transparent colored plate 26 may be increased by installing a light-transmitting body 44 coated with a transparent light-reflecting film, which absorbs little light, such as a thin plate of $TiO_2$ or $ZrO_2$, between the transparent colored plate and lamp 22. Alternatively, a coating of such a material may be formed on the interior surface 26a of the transparent colored plate so that light reflected by a sunlight reflecting body is passed through under direct sunlight.

FIG. 3 illustrates another embodiment of the present invention wherein liquid crystal apparatus 30 is in an inclined position so that it is oriented perpendicular to a line of sight 46 with respect to an observer 42. Inclining liquid crystal device 30 with respect to light source 22, helps to eliminate glare that might otherwise be perceived by observer 42. As a result, interference with the recognition of the signal light due to reflection from surfaces of the transparent electrode substrates of the liquid crystal device, for example, is minimized.

This embodiment may further include a film 48 for absorbing ultraviolet light to prevent the deterioration of the liquid crystal material that might otherwise occur in direct sunlight. The film may be applied to the outer surface of the liquid crystal device 30, e.g., it may be applied directly to the side of substrate 37a opposite from electrode 37. The film may be formed by mixing an ultraviolet light absorbing compound such as a benzophenone derivative, a salicylic acid derivative, or benzotriazole with a resin such as a polymethyl methacrylate, polyethylene, polyethylene terephthalte, or polyvinylchloride.

The embodiment illustrated in FIG. 3 may also include openings 50, e.g., circular holes or louver-type openings, in the outer cylinder 28'. In the case of a signal light which is in continuance use, such as a push button light, the temperature in the outer cylinder and thus in the liquid crystal device 30 may be large enough to detrimentally effect performance of the liquid crystal material. By forming heat-releasing openings 50 in the outer cylinder, the temperature rise of the liquid crystal material is diminished, so that deterioration of its performance characteristics due to high temperature is avoided.

Yet another embodiment of the present invention is illustrated in FIG. 4. As shown, this embodiment includes a layer of non-reflecting light film 52 applied to the side of substrate 37a opposite electrode 37. Layer 52, e.g., may comprise a relatively thin layer of silicon dioxide. Layer 52 reduces the reflection of light striking liquid cyrstal device 30 from the direction of observer 42. Thus, layer 52 minimizes glare or the disturbing effect of such light on persons viewing the signal light. As a result, the visual distinguishability of the color of transparent colored plate 26 is enhanced.

The layer 52 of silicon dioxide may be formed by causing the outer surface of substrate 37a to contact a more or less saturated hydrofluorosilicic acid solution of silicon dioxide for a prescribed period of time. The amount of reflection from the front surface of the signal light may also be reduced by coating the surfaces of one or the other of the transparent electrodes 35,37 with such a non-reflecting film.

Instead of the NCAP liquid cyrstal material, the present invention may utilize a liquid crystal device having a polarizer and analyzer with a liquid crystal oriented between transparent electrodes so that the liquid crystal has a twisted nematic effect The present invention is not limited to use with traffic signals. It may utilized as a signal or warning lamp in various types of equipment and instruments. In such cases, the transparent colored plate be eliminated.

Although certain specific embodiments of the invention have been described herein in detail, the invention is not to be limited only to such embodiments, but rather only by the appended claims.

What is claimed is:

1. A signal light comprising
a light source disposed in the casing for the signal light;
a liquid crystal means disposed between said light source and a viewing area of the signal light for blocking or transmitting light according to a given electrical input;
means for applying said electrical input to said liquid cyrstal means to transmit light when said light source is energized and for removing said electrical input to block light when said light source is de-energized; and
a substantially transparent colored plate disposed between said light source and said liquid crystal means so that light from said light source may be transmitted therethrough when said light source is energized, the surface of said transparent colored plate coated with a transparent light-scattering paint.

2. The signal light of claim 1 wherein said surface is on the side of said transparent colored plate that faces said light source.

3. The signal light of claim 1 further including a light transparent layer having a light-reflecting film disposed between said liquid crystal means and said light source.

4. The signal of claim 1 in which said liquid crystal means is inclined from the vertical with respect to said light source so that the front surface of said liquid cyrstal means is oriented substantially perpendicular to a line of sight of an observer in the view area of the signal light.

5. The signal light of claim 1 further including a layer of material disposed on the side of said liquid crystal means opposite from said light source for absorbing ultraviolet light impinging thereon.

6. The signal light of claim 5 in which said liquid cystal means is inclined from the vertical with respect to said light source so that the front surface of said liquid crystal means is oriented substantially perpendicular to a line of sight of an observer in the viewing area of the signal light.

7. The signal light of claims 1, 5 or 6 further including an outer cylindrical hood extending from said casing and said liquid crystal means disposed within said hood in front of said light source and openings formed in said hood between said liquid crystal means and said light source for releasing heat therefrom.

8. The signal light of claim 1 further including a layer of material disposed on the side of said liquid crystal means opposite from said light source for reducing the reflection of light therefrom.

9. The signal light of claim 8 in which said liquid crystal means is inclined from the vertical with respect to said light source so that the front surface of said liquid crystal means is oriented substantially perpendicular to a line of sight of an observer in the viewing area of the signal light.

10. The signal light of claims 8 or 9 further including an outer cylindrical hood extending from said casing and said liquid crystal means disposed within said hood in front of said light source and openings formed in said hood between said liquid crystal means and said light source for releasing heat therefrom.

11. The signal light of claims 1, 5 or 8 wherein said liquid crystal means comprises a liquid crystal material having a twisted nematic effect.

12. The signal light of claims 1, 5 or 8 wherein said liquid crystal means comprises a liquid crystal material and a containment means for inducing a distorted alignment of said liquid crystal material which in response to such alignment at least one of scatters and absorbs light and which in response to said electrical input reduces the amount of such scattering or absorption.

13. The signal light of claim 12 in which said liquid crystal is birefringent and has an ordinary index of refraction in the presence of an electric field that is substantially matched to the index of refraction of said containment means to minimize refraction and scattering of light and an extraordinary index of refraction in the absence of said electric field that is different from the index of refraction of said containment means to cause refraction and scattering of light.

14. The signal light of claim 12 further comprising electrode means at the opposite surfaces of said liquid crystal material and containment means for applying said electrical input to said liquid crystal material.

15. The signal light of claim 14 further including circuit means for providing electric energy to said light source and said electrode means to effect application of said electrical input to said light source and said liquid crystal means.

16. The signal light of claim 14 further comprising substrate means for supporting the combination of said liquid crystal material and said containment means.

17. The signal light of claim 16 wherein said electrode means are supported on said substrate means.

18. A signal light comprising:
a light source disposed toward the rear of a casing for the signal light;
a liquid crystal means disposed between said light source and a viewing area of the signal light for blocking or transmitting light according to a given electrical input;
means for applying said electrical input to said liquid crystal means to transmit light when said light source is energized and for removing said electrical input to block light when said light source is de-energized;
a substantially transparent colored plate disposed between said light source and said liquid crystal means so that light from said light source may be transmitted therethrough when said light source is energized; and
an outer cylindrical hood extending from said casing with said liquid crystal means disposed within said hood in front of said light source and openings formed in said hood between said liquid crystal means and said light source for releasing heat therefrom.

19. A signal light comprising:
a light source in a casing for the signal light;
a liquid crystal means disposed between said light source and a viewing area of the signal light for blocking or transmitting light according to a given electrical input, said liquid crytal means inclined from the vertical so that the front surface of said liquid crystal means is oriented substantially perpendicular to a line of sight of an observer in the viewing area of the signal light;
means for applying said electrical input to said liquid crystal means to transmit light when said light source is energized and for removing said electrical input to block light when said light source is de-energized; and
a substantially transparent colored plate disposed between said light source and said liquid crystal means so that light from said light source may be transmitted therethrough when said light source is energized.

20. The signal light of claim 19 further including an outer cylindrical hood extending from said casing wherein said liquid crystal means is disposed within said hood in front of said light source and openings are formed in said hood between said liquid crystal means and said light source for releasing heat therefrom.

* * * * *

UNITED STATES PATENT AND TRADEMARK OFFICE
CERTIFICATE OF CORRECTION

PATENT NO. : 4,791,418
DATED : December 13, 1988
INVENTOR(S) : Kawahara et al.

It is certified that error appears in the above—identified patent and that said Letters Patent is hereby corrected as shown below:

Col. 1, ln. 42, delete "view" and substitute therefor --viewing--

Col. 4, ln. 19, please add --.-- after "effect".

Col. 4, ln. 21, please add --be-- after "It may".

Col. 4, ln. 23, please add --may-- after "plate".

Claim 1, ln. 2, delete "the" and substitute therefor --a--.

Signed and Sealed this

Twenty-seventh Day of June, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,791,418

DATED : December 13, 1988

INVENTOR(S) : Hideo Kawahara; Harunobu Yoshida; Masato Hyodo

It is certified that error appears in the above-identified patent and that said Letters Patent is hereby corrected as shown below:

On the title page of the patent, after the application filing date, please add:

[30] Foreign Application Priority Data

Jun. 30, 1986 [JP] Japan ....61-100191
Nov. 05, 1986 [JP] Japan ....61-170057
Nov. 05, 1986 [JP] Japan ....61-170058

Signed and Sealed this

Seventh Day of April, 1992

Attest:

HARRY F. MANBECK, JR.

Attesting Officer

Commissioner of Patents and Trademarks